United States Patent
Kadam

(10) Patent No.: US 12,537,456 B2
(45) Date of Patent: Jan. 27, 2026

(54) BI-DIRECTIONAL POWER CONVERTER

(71) Applicant: Siemens Aktiengesellschaft, Munich (DE)

(72) Inventor: Abhijit Kadam, Maharashtra (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 219 days.

(21) Appl. No.: 18/271,581

(22) PCT Filed: Jan. 24, 2022

(86) PCT No.: PCT/EP2022/051455
§ 371 (c)(1),
(2) Date: Jul. 10, 2023

(87) PCT Pub. No.: WO2022/157348
PCT Pub. Date: Jul. 28, 2022

(65) Prior Publication Data
US 2024/0313661 A1     Sep. 19, 2024

(30) Foreign Application Priority Data

Jan. 25, 2021   (DE) .................... 10 2021 101 480.8

(51) Int. Cl.
*H02M 3/335*   (2006.01)
*H02M 7/487*   (2007.01)
(Continued)

(52) U.S. Cl.
CPC ....... *H02M 3/33584* (2013.01); *H02M 7/487* (2013.01); *H02M 7/797* (2013.01); *H02M 1/0095* (2021.05); *H02M 3/33573* (2021.05)

(58) Field of Classification Search
CPC .......... H02M 1/0095; H02M 3/33569–33584; H02M 7/483; H02M 7/487; H02M 7/537–5395; H02M 7/797
See application file for complete search history.

(56) References Cited

U.S. PATENT DOCUMENTS 9,960,666 B2    5/2018  Zhao et al.
9,966,875 B2 *  5/2018  Wang .................... H02M 7/483
(Continued)

FOREIGN PATENT DOCUMENTS

CH    707553 A2    8/2014
CH    708218 A2    12/2014
(Continued)

OTHER PUBLICATIONS

Machine translation of DE 102017120298. Obtained from internal USPTO databases on Apr. 29, 2025. Original publication Mar. 7, 2019. (Year: 2019).*

(Continued)

*Primary Examiner* — Fred E Finch, III
(74) *Attorney, Agent, or Firm* — Schmeiser, Olsen & Watts LLP

(57) ABSTRACT

A bi-directional power converter, a control unit, a charging device and a method for transferring power between an EV and a power grid are provided. The bi-directional power converter includes an isolated DC-DC converter having a first stage converting a DC voltage into a high frequency AC voltage, a second stage capable of converting a high frequency AC voltage having an amplitude V2 into the DC voltage having an amplitude of V2 or 2V2, and converting the DC voltage into a multi-level high frequency AC voltage, and an intermediary stage electrically coupled to the first and the second stages, having a high frequency transformer of a turns ratio V1:V2.

14 Claims, 8 Drawing Sheets

(51) Int. Cl.
    *H02M 7/797*    (2006.01)
    *H02M 1/00*    (2006.01)

(56) References Cited

U.S. PATENT DOCUMENTS

| | | | |
|---|---|---|---|
| 2016/0204713 A1* | 7/2016 | Dwari | H02M 7/217 |
| | | | 363/89 |
| 2018/0091037 A1 | 3/2018 | Zhao et al. | |
| 2019/0052177 A1 | 2/2019 | Lu et al. | |
| 2020/0366211 A1* | 11/2020 | Zhang | H02M 3/33573 |
| 2021/0016672 A1* | 1/2021 | Zhu | H02J 7/00714 |
| 2021/0152080 A1* | 5/2021 | Lukic | H02J 7/06 |
| 2021/0203237 A1* | 7/2021 | Hang | H02M 1/00 |

FOREIGN PATENT DOCUMENTS

| | | | |
|---|---|---|---|
| DE | 102017120298 A1 | 3/2019 | |
| WO | 2018/208991 A1 | 11/2018 | |

OTHER PUBLICATIONS

International Search Report for PCT/EP2022/051455, mailed on May 11, 2022.
Written Opinion for PCT/EP2022/051455, mailed on May 11, 2022.

* cited by examiner $V_{AB} = +V_2$ $V_{AB} = -V_2$ $V_{AB} = 0$ $V_{AB} = 0$ $V_{AB} = +V_2$ $V_{AB} = -V_2$ $V_{AB} = 0$ $V_{AB} = 0$

BI-DIRECTIONAL POWER CONVERTER

CROSS-REFERENCE TO RELATED APPLICATIONS

This application claims priority to PCT Application No. PCT/EP2022/051455, having a filing date of Jan. 24, 2022, which claims priority to German Application No. 10 2021 101 480.8, having a filing date of Jan. 25, 2021, the entire contents both of which are hereby incorporated by reference.

FIELD OF TECHNOLOGY

The following relates to a power converter. More particularly, the present disclosure relates to a bidirectional power converter employable in DC fast charging of Electric Vehicles (EVs).

BACKGROUND

EVs are being adopted worldwide as an alternative to the traditional internal combustion-based vehicles. Therefore, there arises a growing demand for the development of charging infrastructure for fast charging of these EVs. One of the methods for fast charging is a DC fast charger. FIG. 1A illustrates a block diagram of a DC charger 100 employed in charging of EVs 106, according to state of the conventional art. The DC charger 100 includes a low voltage input module 101, a power electronic module 102 also referred to as a power converter 102, and an output module 103 electrically coupled to one another as shown in FIG. 1A. The low voltage input module has a 3-phase AC voltage supply Vac coming from the power grid 101A and an input side protection unit 101B. The power converter 102 has an input filter 102A, a 3-phase AC to DC converter 102B such as a 3-phase pulse width modulation (PWM) converter and an isolated DC-DC converter 102C, electrically coupled with one another. The output module 103 is an output protection unit that provides DC voltage at its output which is used by an EV 106 for DC fast charging. The DC charger 100 also includes a controller module 104 having one or more controllers 104A, 104B. The controller module 104 is electrically coupled with the power converter 102 for controlling the 3-phase pulse width modulation (PWM) converter 102B and the isolated DC-DC converter 102C.

The DC charger 100 also includes a software module 105 having a user interface 105A such as a human machine interface (HMI) electrically coupled with a communication controller module 105B which in turn communicates with portable electronic devices 105C such as cell phones, a cloud communication network 105D and/or the power grid 105E. The communication controller module 105B also communicates with the EV 106.

The DC output voltage being provided to the EV 106 should conform to the battery voltage rating of the EV 106 being charged. Usually, the battery capacity and voltage requirement of an EV 106 varies depending upon the EV range, that is, the distance which the EV 106 can cover in one full battery charge. For example, low range vehicles have a battery voltage of about 150V, whereas high range or heavy vehicles like E-trucks and E-Buses have a battery voltage of about 1000V. Therefore, for charging various types of EVs 106, the DC output voltage of the DC charger 100 should have a wide range from about 150V to about 1500V while ensuring delivery of high power over the whole range.

FIG. 1B illustrates an electrical circuit diagram of the power converter 102 of the DC charger 100 shown in FIG. 1A, according to state of the conventional art. The power converter 102 receives a 3-phase AC input Vac from the input module 101 which is then provided to its 3-phase AC to DC conversion module 102B which provides a DC output voltage V1 which in turn is provided as an input to the DC-DC converter 102C. The DC-DC converter 102C typically comprises two power conversion stages namely a first stage 201 performing DC to high frequency AC conversion and a second stage 202 performing high frequency AC to DC conversion. At the first stage 201, the DC voltage V1 is converted to a high frequency AC voltage of amplitude V1. At the second stage 202, a high frequency AC voltage of amplitude V2 is converted to the output DC voltage of Vo. These two stages 201 and 202 are coupled by an intermediary stage 203 providing high frequency isolation therebetween. The intermediary stage 203 includes a high frequency transformer connected between the first stage 201 and the second stage 202 having a turns ratio of V1:V2.

As shown in FIG. 1B, a generic dual active bridge converter having four switches S5, S6, S7 and S8 is employed at the second stage 202. A switching table for the second stage 202 is shown in Table 1 below where:
  The values 1 and 0 symbolize switch turn on and switch turn off respectively;
  VAB is the voltage between nodes A and B; and
  Vo is the DC voltage of the converter.

TABLE 1

| VAB | S5 | S6 | S7 | S8 | Vo |
| --- | --- | --- | --- | --- | --- |
| +V2 | 1 | 0 | 0 | 1 | +V2 |
| −V2 | 0 | 1 | 1 | 0 | +V2 |
| 0 | 1 | 1 | 0 | 0 | +V2 |
| 0 | 0 | 0 | 1 | 1 | +V2 |

From table 1, it is clear that, the maximum output voltage Vo offered by the conventional power converter 102 of the DC charger 100 shown in FIG. 1A, is equal to the amplitude of high frequency voltage V2. Moreover, each of the switches S5, S6, S7 and S8 is rated for a voltage of V2. Hence, for an output voltage of 1000V, considering a 1.5 times margin, there would be a need of at least 1500V rated switch(es). The next highest voltage rating silicon carbide (SiC MOSFET) switch available is of 1200V and 1700V. However, current rating for a 1700V switch is not very high. Therefore, two switches of 1200 BV are required to be connected in series to represent each of the switch S5, S6, S7 and S8. Thus, making a total requirement of 8 SiC MOSFETs. Moreover, for same power rating at low voltage output, that is, of about 300V, high current flows through the switches S5, S6, S7 and S8. Consequently, the current rating requirement of the switches also increases.

SUMMARY

An aspect relates to a bi-directional power converter that provides a wide range of DC voltages without compromising on delivery of power across the DC voltage range and optimizing requirement of a number of switches used therein.

Moreover, it is another aspect of the present disclosure to provide a charging device and method employing aforementioned bi-directional power converter for transferring power between an electric vehicle and a power grid.

The bi-directional power converter disclosed herein achieves the aforementioned object in that an isolated DC-DC converter of the bi-directional power converter includes a second stage that is capable of converting a high frequency AC voltage V2ac having an amplitude V2 into a DC voltage Vdc of an amplitude V2 or 2V2 and converting the DC voltage Vdc into a multi-level high frequency AC voltage V2ac.

According to one aspect of the present disclosure, the bi-directional power converter disclosed herein comprises an AC-DC converter, for example, a 3 phase AC to DC converter generating a DC voltage V1 from an AC voltage Vacgrid received from an AC power grid. According to this aspect of the present disclosure, the bi-directional power converter comprises an input filter filtering the AC voltage Vacgrid.

According to another aspect of the present disclosure, the bi-directional power converter receives a DC voltage Vdcgrid from a DC power grid as the DC voltage V1. The bi-directional power converter comprises an isolated DC-DC converter. According to this aspect of the present disclosure, the DC voltage Vdcgrid is fed to the isolated DC-DC converter without requirement of an AC-DC conversion.

The isolated DC-DC converter comprises a first stage, a second stage, and an intermediary stage electrically coupling the first stage to the second stage. The first stage converts the DC voltage V1 into a high frequency AC voltage V1ac, that is, at the first stage, a DC voltage V1 is converted to high frequency AC voltage of amplitude V1 and vice versa, that is, a high frequency AC voltage V1ac into the DC voltage V1. According to one aspect, the first stage comprises a capacitor connected across the output of the 3-phase AC-DC converter, across which the DC voltage V1 appears. The first stage also comprises four switches. The first stage comprises four power conversion switches S1-S4 electrically coupled to a primary winding A'-B' of a high frequency transformer of the intermediary stage such that a second terminal of a first power conversion switch S1 is connected to a first terminal of a second power conversion switch S2 and a first end A' of the primary winding is connected to the second terminal of the first power conversion switch S1 and the first terminal of the second power conversion switch S2, a first terminal of the first power conversion switch S1 is connected to a first terminal of a third power conversion switch S3, and a second terminal of the second power conversion switch S2 is connected to a second terminal of a fourth power conversion switch S4, and a second terminal of the third power conversion switch S3 is connected to a first terminal of the fourth power conversion switch S4, and a second end B' of the primary winding is connected to the first terminal of the fourth power conversion switch S4 and the second terminal of the third power conversion switch S3.

According to one aspect, the second stage converts a high frequency AC voltage V2ac having an amplitude V2 into the DC voltage Vdc. The DC voltage Vdc is equal to V2 or 2V2, thereby, providing for a wider range of DC voltage. According to this aspect, the bi-directional power converter is configured in a power conversion mode of operation, that is, converting AC voltage to DC voltage and/or DC voltage to DC voltage. In this power conversion mode, the bi-directional power converter may find applications in devices employed for a grid to vehicle G2V charging.

According to another aspect, the second stage converts the DC voltage Vdc into the high frequency AC voltage V2ac. The high frequency AC voltage V2ac is a multi-level AC voltage. According to this aspect, the bi-directional power converter is configured in a power inversion mode of operation, that is, converting DC voltage to multi-level AC voltage. The multi-level AC voltage V2ac comprises five levels namely +0.5V2, +V2, 0, −V2 and −0.5V2 corresponding to the DC voltage Vdc having an amplitude V2. It would be understood by a person skilled in the conventional art that these levels are scalable corresponding to the amplitude of the DC voltage Vdc, that is, for the DC voltage having an amplitude of 2V2 the levels are +V2, +2V2, 0, −2V2, and −V2. In this power inversion mode, the bi-directional power converter may find applications in devices employed for a vehicle to grid V2G charging and/or energy storage which a requirement posed under several standards pertaining to EV charging.

The intermediary stage comprises a high frequency transformer having a turns ratio equal to a ratio of the high frequency AC voltage V1ac and the high frequency AC voltage V2ac, that is, V1:V2. V1 depends on the power grid supply voltage connection and V2 depends on a maximum voltage capacity of a vehicle battery. For example, V1 can range from about 300 to about 800V and V2 can range from about 400V to about 1000V.

According to one aspect, the high frequency transformer is a two-winding transformer, for example having a single primary winding and a single secondary winding. According to this aspect, the high frequency AC voltage V1ac is applied to the primary winding and the high frequency AC voltage V2ac is applied to the secondary winding. According to another aspect, the high frequency transformer is a multi-winding transformer, for example having multiple windings at the primary side and multiple windings at the secondary side. According to this aspect, the high frequency AC voltage V1ac is applied to one of the windings at the primary side and the high frequency AC voltage V2ac is applied to a set of multiple windings on the secondary side. According to this aspect, multiple second stages, that is, one per winding at the secondary side, are connected in parallel.

The second stage comprises six power conversion switches S5-S10. The power conversion switches are two-quadrant switches. The second stage also comprises a voltage selection switch S11. The voltage selection switch is a bi-directional switch or a four-quadrant switch. As used herein, the term "switch" refers to a switching device capable of connecting and disconnecting two electrical nodes realized, for example, using an Insulated-Gate Bipolar Transistor (IGBT), a Metal-Oxide-Semiconductor Field-Effect Transistor (MOSFET), thyristors, diodes, variable resistances or using any other devices of this class apparent to a person skilled in the conventional art. The switch may also be a mechanical switch such as a contactor. Each of the six power conversion switches may be realized using a series or a parallel connection of one or more individual switches with help of a common gating logic pulse that would meet the voltage and current requirements of the bi-directional power converter.

The second stage also comprises two or more capacitors electrically coupled with the power conversion switches and the voltage selection switch such that each of the capacitors is equally charged during operation of the power converter. The second stage comprises the capacitors, for example, C1 and C2, such that the six power conversion switches, for example, S5, S6, S7, S8, S9 and S10, are symmetrically arranged across the capacitors C1 and C2 thereby, enabling simplification of design and stable operation of the bi-directional power converter.

The power conversion switches S5-S10 of the second stage are arranged across a secondary winding A-B of the high frequency transformer such that a first terminal of a first power conversion switch S5 is connected to a second terminal of a second power conversion switch S9 and a second terminal of the first power conversion switch S5 is connected to a first end A of the secondary winding, a first terminal of the second power conversion switch S9 is connected to positive DC voltage Vdc, a first terminal of a third power conversion switch S6 is connected to the first terminal of the first power conversion switch S5 and a second terminal of the second power conversion switch S9, and a second terminal of the third power conversion switch S6 is connected to a second end B of the secondary winding, a first terminal of a fourth power conversion switch S7 is connected to the first end A and a second terminal of the fourth power conversion switch S7 is connected to a first terminal of a fifth power conversion switch S10, a second terminal of the fifth power conversion switch S10 is connected to negative DC voltage Vdc, and a first terminal of a sixth power conversion switch S8 is connected to the second end B, and a second terminal of the sixth power conversion switch S8 is connected to the first terminal of the fifth power conversion switch S10 and a second terminal of the fourth power conversion switch S7.

Moreover, the voltage selection switch S11 and the capacitors C1, C2 of the second stage are arranged across the secondary winding A-B of the high frequency transformer such that the capacitors C1, C2 form a DC midpoint therebetween for the DC voltage Vdc, and the voltage selection switch S11 is connected between the DC midpoint and the second end B.

Each of the power conversion switches S1-S10 of the first stage and the second stage, when in an off state, blocks a positive DC voltage Vdc applied across the first terminal and the second terminal of each of the power conversion switches S1-S10.

In the aforementioned power conversion mode of the bi-directional power converter, the second stage dynamically controls the DC voltage Vdc between V2 and 2V2, based on a voltage requirement of the EV, that is based on a capacity of the vehicle battery. This dynamic variation in the DC voltage Vdc is achieved by opening and closing of the voltage selection switch. The voltage selection switch when in a closed state enables the second stage to generate the DC voltage Vdc having an amplitude of 2V2 corresponding to the high frequency AC voltage V2ac of the amplitude V2. During this state of the voltage selection switch being closed, two of the six power conversion switches are maintained in a closed state corresponding to the positive high frequency AC voltage V2ac, the negative high frequency AC voltage V2ac, and zero high frequency AC voltage V2ac appearing across the high frequency transformer of the intermediary stage.

Similarly, the voltage selection switch when in an open state enables the second stage to generate the DC voltage Vdc having an amplitude V2 corresponding to the high frequency AC voltage V2ac having the amplitude V2. During this state of the voltage selection switch being open, four of the six power conversion switches are maintained in a closed state corresponding to the positive high frequency AC voltage V2ac and the negative high frequency AC voltage V2ac, whereas two of the six power conversion switches are maintained in a closed state corresponding to zero high frequency AC voltage V2ac appearing across the high frequency transformer of the intermediary stage.

It would be understood to a person skilled in the conventional art that multiple such bi-directional power converters may be connected together and employed as a multiphase converter with multiphase input and/or output connections. Moreover, each single phase converter can have multiple input connections connected together in parallel.

Also, disclosed herein is a control unit controlling the aforementioned bi-directional power converter and more specifically the isolated DC-DC converter of the bi-directional power converter. The control unit comprises controller(s) that selectively switch the voltage selection switch S11 of the second stage of the isolated DC-DC converter of the bi-directional power converter, between an on state and an off state based on a voltage requirement of a battery of an electric vehicle when connected to a vehicle-side module connectable to the bi-directional power converter.

When the voltage selection switch S11 is in the off state and when the high frequency AC voltage V2ac is +V2, the control unit switches on a first power conversion switch S5, a second power conversion switch S9, a fifth power conversion switch S10, and a sixth power conversion switch S8 of the second stage 204, and switches off a third power conversion switch S6, and a fourth power conversion switch S7.

When the voltage selection switch S11 is in the off state and when the high frequency AC voltage V2ac is −V2, the control unit switches on the second power conversion switch S9, the third power conversion switch S6, the fourth power conversion switch S7, and the fifth power conversion switch S10 of the second stage, and switches off the first power conversion switch S5 and the sixth power conversion switch S8.

When the voltage selection switch S11 is in the off state and when high frequency AC voltage V2ac is zero, the control unit switches on the fourth power conversion switch S7 and the sixth power conversion switch S8, and switch off the first power conversion switch S5, the second power conversion switch S9, the third power conversion switch S6, and the fifth power conversion switch S10.

Similarly, when the voltage selection switch S11 is in the on state and when the high frequency AC voltage V2ac is +V2, the control unit switches on the first power conversion switch S5, the second power conversion switch S9, and switches off a third power conversion switch S6, and a fourth power conversion switch S7, a fifth power conversion switch S10, and a sixth power conversion switch S8 of the second stage.

When the voltage selection switch S11 is in the on state and when the high frequency AC voltage V2ac is −V2, the control unit switches on the fourth power conversion switch S7 and the fifth power conversion switch S10, and switches off the first power conversion switch S5, the second power conversion switch S9, the third power conversion switch S6, and the sixth power conversion switch S8 of the second stage.

When the voltage selection switch S11 is in the on state and when high frequency AC voltage V2ac is zero, the control unit switches on the fourth power conversion switch S7 and the sixth power conversion switch S8, and switch off the first power conversion switch S5, the second power conversion switch S9, the third power conversion switch S6, and the fifth power conversion switch S10.

Moreover, the controller(s) control the power conversion switches S5-S10 and the voltage selection switch S11 such that a DC voltage Vdc available across capacitors of the second stage is converted into a high frequency AC voltage V2ac at a secondary winding of an intermediary stage of the isolated DC-DC converter. The high frequency AC voltage being a multi-level, particularly five level AC voltage.

For example, the controllers switch on the first power conversion switch S5, the second power conversion S9, the fifth power conversion switch S10 and the sixth power conversion switch S8, and switch off the third power conversion switch S6, the fourth power conversion switch S7 and the voltage selection switch S11, for generating a positive multi-level voltage having an amplitude equal to the DC voltage Vdc.

For example, the controllers switch on the first power conversion switch S5, the second power conversion S9 and the voltage selection switch S11, and switch off the third power conversion switch S6, the fourth power conversion switch S7 the fifth power conversion switch S10 and the sixth power conversion switch S8, for generating a positive multi-level voltage having an amplitude equal to half of the DC voltage Vdc.

For example, the controllers switch off the first power conversion switch S5, the second power conversion S9, the third power conversion switch S6 and the sixth power conversion switch S8, and switch on the fourth power conversion switch S7, the fifth power conversion switch S10 and the voltage selection switch S11, for generating a negative multi-level voltage having an amplitude equal to half of the DC voltage Vdc.

For example, the controllers switch off the first power conversion switch S5, the sixth power conversion S8 and the voltage selection switch S11, and switch on the second power conversion switch S9, the third power conversion switch S6, the fourth power conversion switch S7 and the fifth power conversion switch S10, for generating a negative multi-level voltage having an amplitude equal to the DC voltage Vdc.

For example, the controllers switch on the second power conversion switch S9, the third power conversion switch S6, the fourth power conversion S7 and the fifth power conversion switch S10, and switch off the first power conversion switch S5, the sixth power conversion switch S8 and the voltage selection switch S11, for generating a multi-level voltage having a zero amplitude.

Also, the controllers switch off the first power conversion switch S5, the second power conversion switch S9, the third power conversion switch S6 and the sixth power conversion S8, and switch on the fourth power conversion switch S7, the fifth power conversion switch S10 and the voltage selection switch S11, for generating a multi-level voltage having a zero amplitude.

Thus, the control unit selectively triggers the power conversion switches S5-S10 and the voltage selection switch S11 for operating the bi-directional converter in a power conversion mode or a power inversion mode.

Also, disclosed herein is a charging device for transferring power between an electric vehicle (EV) and a power grid. The charging device comprises the aforementioned control unit, the aforementioned bi-directional power converter being controlled by the control unit, a grid-side module, and a vehicle-side module.

The grid-side module is capable of receiving, for example, in the power conversion mode of the bi-directional power converter, an AC voltage Vacgrid or a DC voltage Vdcgrid from the power grid, for example, an AC power grid or a DC power grid and/or an energy storage system respectively. The grid-side module is also capable of delivering, for example, in the power inversion mode of the bi-directional power converter, the AC voltage Vacgrid or the DC voltage Vdcgrid to the power grid.

The vehicle-side module is capable of delivering a DC voltage Vdc to the EV connected to the charging device, for example, in the power conversion mode of the bi-directional power converter and receiving a DC voltage Vdc from the EV connected to the charging device, for example, in the power inversion mode of the bi-directional power converter.

The charging device disclosed herein, is a DC fast charger capable of charging a wide range of EVs including, for example, light motor vehicles such as cars and heavy duty EVs such as trucks, buses, etc.

Also, disclosed herein is a method for transferring power between an electric vehicle (EV) and a power grid using the aforementioned charging device. In embodiments, the method comprises detecting physical connection of the EV to the vehicle-side module of the charging device, and selectively operating the bi-directional power converter of the charging device in a power conversion mode or a power inversion mode.

The power conversion mode of the bi-directional power converter comprises conversion of the AC voltage Vacgrid received from the power grid into the DC voltage Vdc having amplitudes V2 or 2V2. The voltage selection switch of the second stage of the bi-directional power converter, when in a closed state enables the bi-directional power converter to generate the DC voltage Vdc having the amplitude 2V2 and when in an open state enables the bi-directional power converter to generate the DC voltage Vdc having the amplitude V2. In embodiments, the method includes selectively positioning the voltage selection switch between the open state and the closed state based on a voltage requirement of a battery of the EV, for example, light-duty or a heavy-duty EV. In embodiments, the method further includes providing the DC voltage Vdc to the EV via the vehicle-side module of the charging device for charging the electric vehicle.

According to one aspect, the method determines a DC voltage Vdc required for charging the EV, for example, based on a make and a type of the vehicle such as a heavy-duty truck or a light motor vehicle, etc., and then selectively operating the voltage selection switch, that is, between an open state and a closed state, based on the DC voltage Vdc required, that is, V2 or 2V2, and charging the EV with the DC voltage Vdc generated by the second stage of the bi-directional power converter.

The power inversion mode of the bi-directional power converter comprises conversion of the DC voltage Vdc received from the EV into the multi-level AC voltage V2ac having, for example, levels −0.5V2, −V2, 0, +V2, and +0.5V2 corresponding to the DC voltage Vdc having an amplitude V2. The AC voltage V2ac is then provided to intermediary stage of the bi-directional power converter.

According to one aspect, this selection of mode of operation, that is, power conversion mode or power inversion mode is performed, for example, by a user operating the charging device. According to another aspect, the charging device is pre-set for a particular mode of operation by a user operating the charging device. According to yet another aspect, the method dynamically selects a mode of operation based on availability of voltage supply from power grid, for example, if the power grid is not supplying required AC or DC voltage then the method automatically switches into a power inversion mode feeding power into the grid and vice versa.

The above mentioned and other features of embodiments the invention will now be addressed with reference to the accompanying drawings of embodiments the present invention. The illustrated embodiments are intended to illustrate, but not limit the invention.

BRIEF DESCRIPTION

Some of the embodiments will be described in detail, with reference to the following figures, wherein like designations denote like members, wherein.

DETAILED DESCRIPTION

Figure 2A:
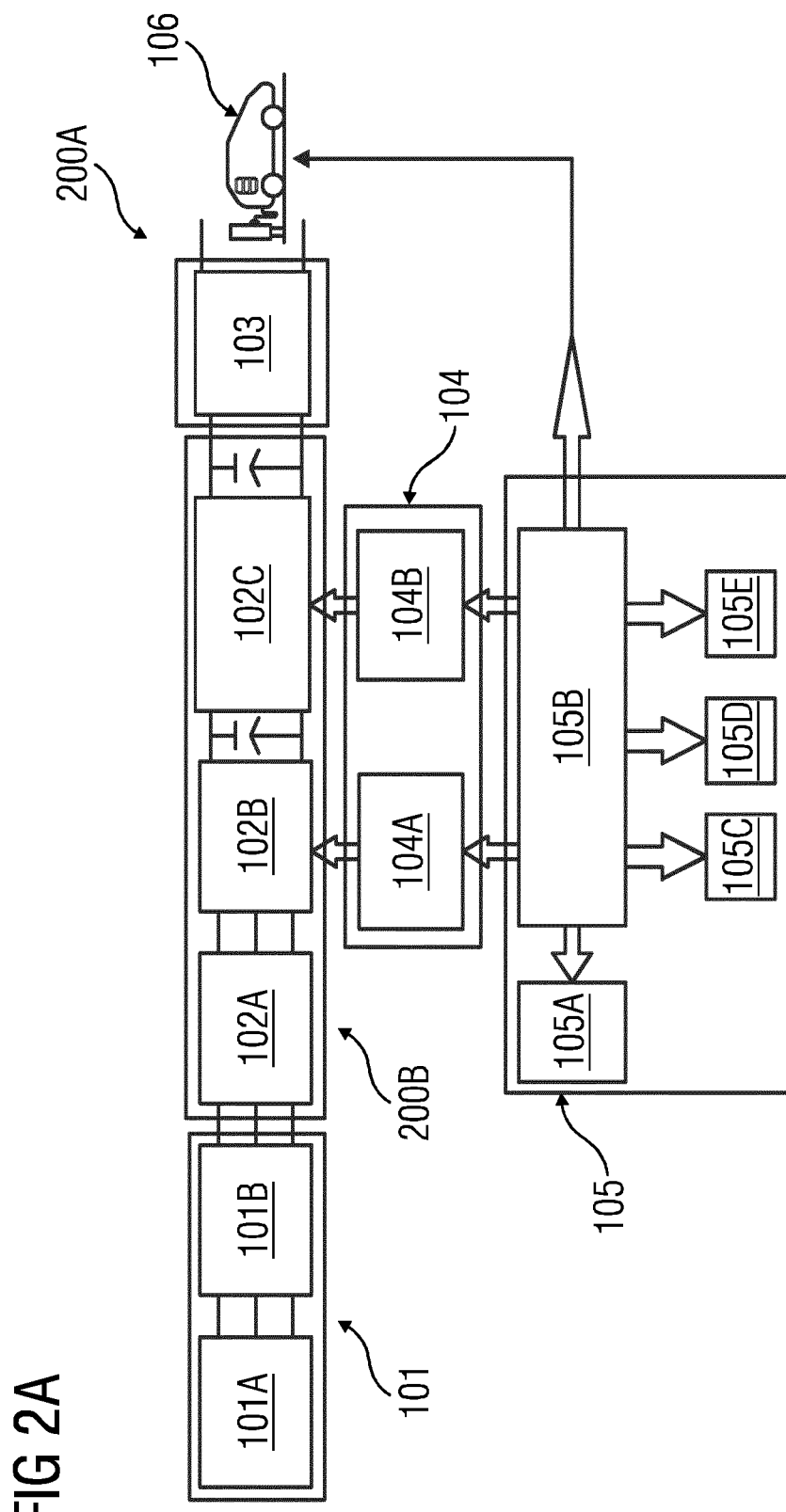
FIG. 2A illustrates a block diagram of a charging device, according to an embodiment of the present disclosure.

FIG. 2A illustrates a block diagram of a charging device 200A, according to an embodiment of the present disclosure. The charging device 200A includes a grid-side module 101, a bi-directional power converter 200B, and a vehicle-side module 103 electrically coupled to one another as shown in FIG. 2A. The grid-side module 101 has a 3-phase AC voltage supply Vacgrid represented by 101A coming from the power grid and a protection unit 101B electrically coupled to the 3-phase AC voltage supply 101A. The grid-side module 101 acts as an interface between the bi-directional power converter 200B and the power grid for receiving and delivering AC voltage Vacgrid from and to the power grid.

The bi-directional power converter 200B has an input filter 102A, a 3-phase AC to DC converter 102B such as a 3-phase pulse width modulation (PWM) converter and an isolated DC-DC converter 102C, electrically coupled with one another. The vehicle-side module 103 is a protection unit that is capable of receiving and delivering a DC voltage Vdc from and to an EV 106. The charging device 200A also includes a controller module 104 having one or more controllers 104A, 104B. The controller module 104 is electrically coupled with the bi-directional power converter 200B for controlling the 3-phase pulse width modulation (PWM) converter 102B and the isolated DC-DC converter 102C.

The charging device 200A also includes a software module 105 having a user interface 105A such as a human machine interface (HMI) electrically coupled with a communication controller module 105B which in turn communicates with portable electronic devices 105C such as cell phones, a cloud communication network 105D and/or the power grid 105E. The communication controller module 105B also communicates with the EV 106.

Figure 2B:
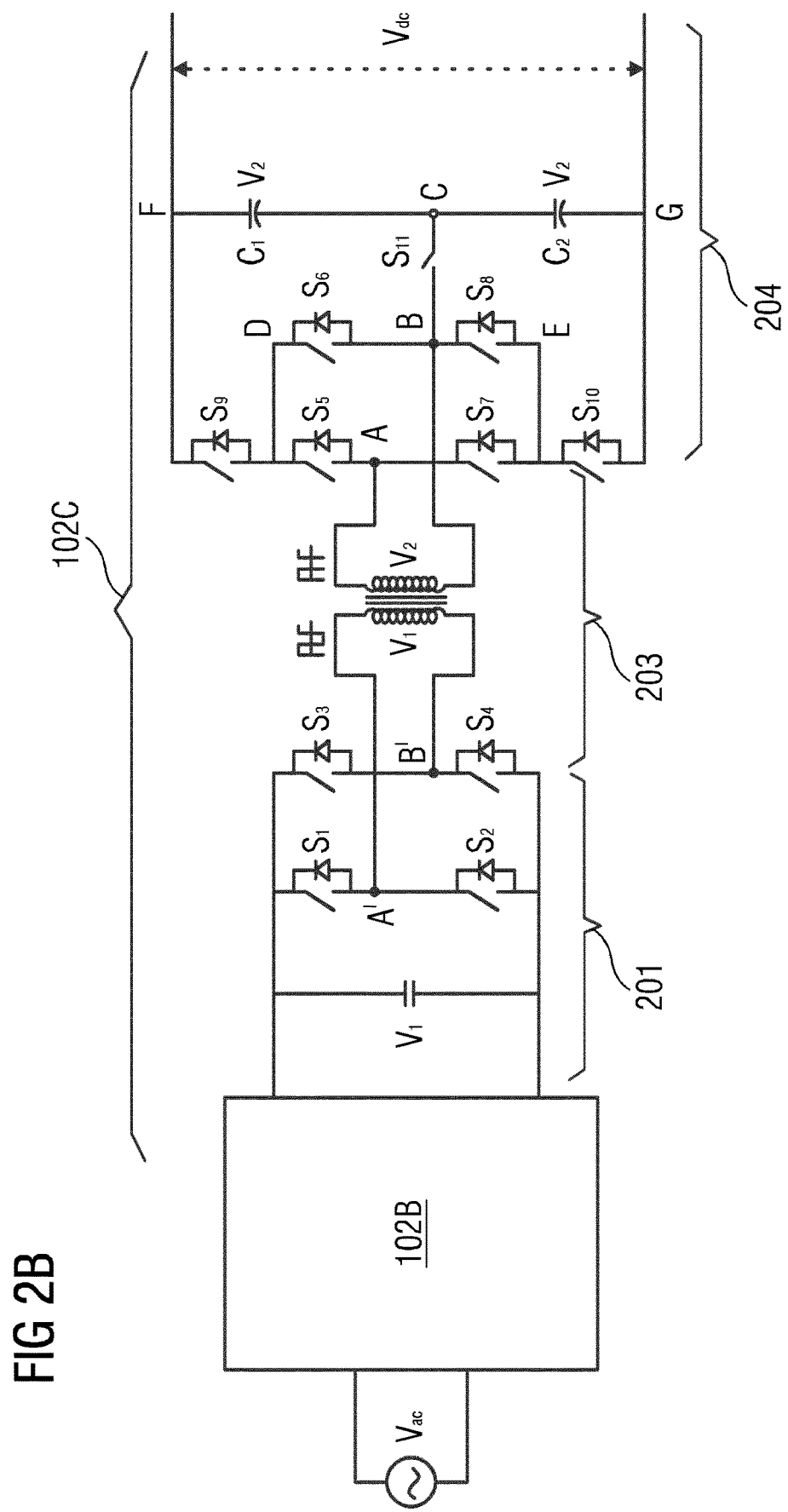
FIG. 2B illustrates an electrical circuit diagram of a bi-directional power converter, according to an embodiment of the present disclosure.
Figure 3A:
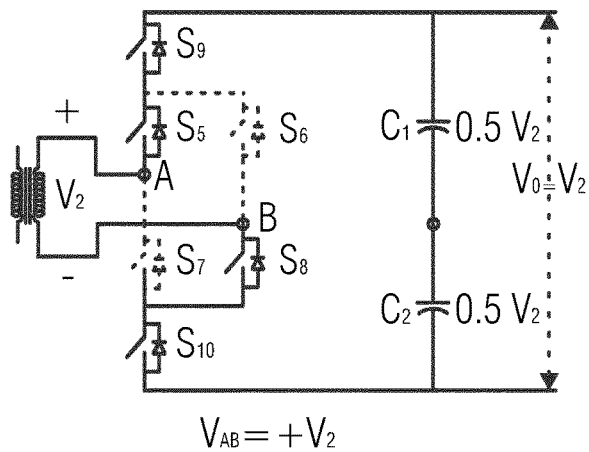
FIG. 3A illustrates current flow through the circuit diagram of the bi-directional power converter shown in FIG. 2B when a voltage selection switch of the bi-directional power converter is open.
Figure 3B:
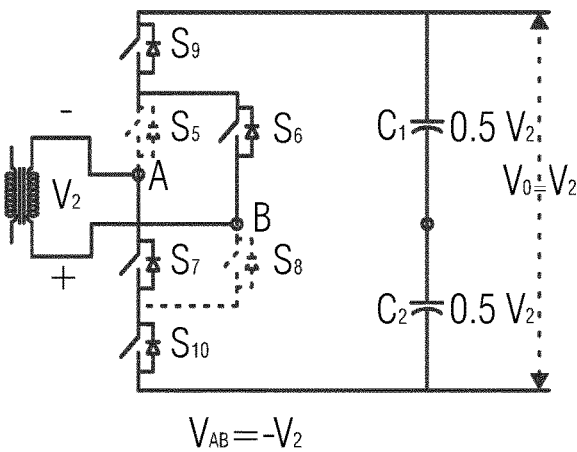
FIG. 3B illustrates current flow through the circuit diagram of the bi-directional power converter shown in FIG. 2B when a voltage selection switch of the bi-directional power converter is open.
Figure 3C:
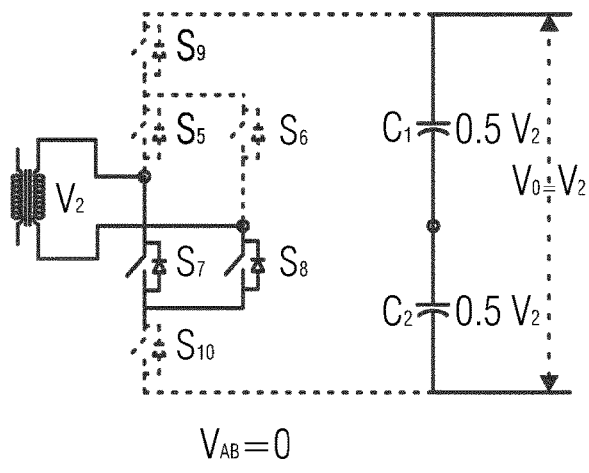
FIG. 3D illustrates current flow through the circuit diagram of the bi-directional power converter shown in FIG. 2B when a voltage selection switch of the bi-directional power converter is open.
Figure 3D:
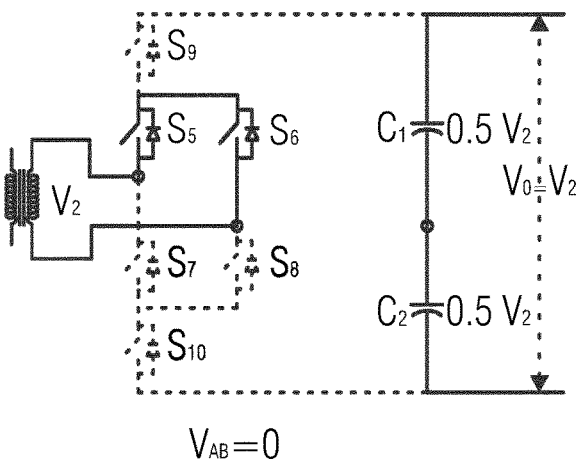
Figure 4A:
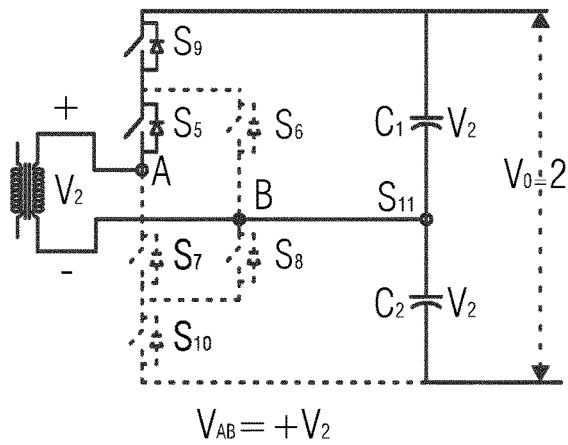
FIG. 4A illustrates current flows through the circuit diagram of the bi-directional power converter shown in FIG. 2B when the voltage selection switch of the bi-directional power converter is closed.
Figure 4B:
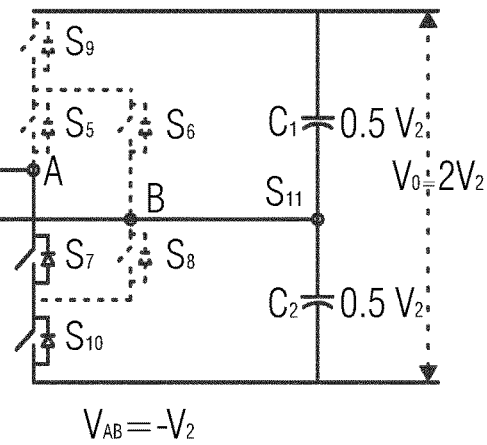
FIG. 4B illustrates current flow through the circuit diagram of the bi-directional power converter shown in FIG. 2B when the voltage selection switch of the bi-directional power converter is closed.
Figure 4C:
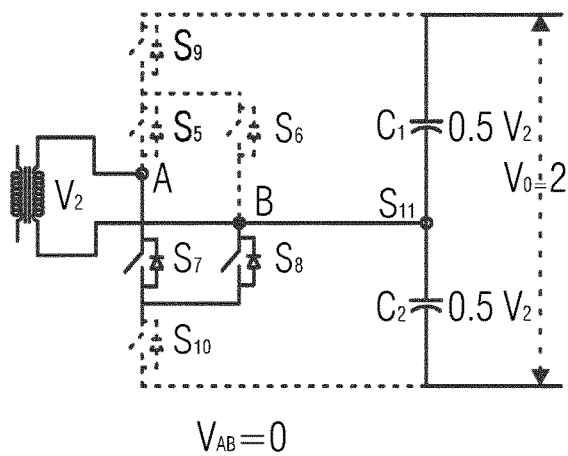
FIG. 4C illustrates current flow through the circuit diagram of the bi-directional power converter shown in FIG. 2B when the voltage selection switch of the bi-directional power converter is closed.
Figure 4D:
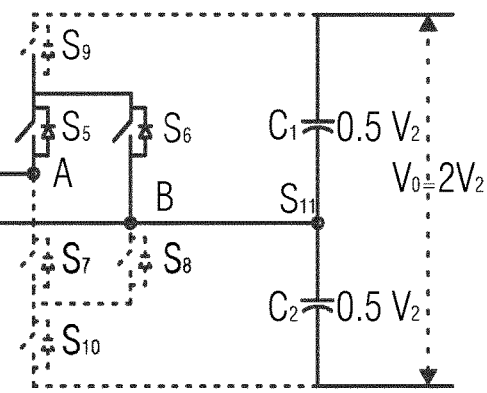
FIG. 4D illustrates current flow through the circuit diagram of the bi-directional power converter shown in FIG. 2B when the voltage selection switch of the bi-directional power converter is closed.

FIG. 2B illustrates an electrical circuit diagram of a bi-directional power converter 200B, according to an embodiment of the present disclosure. The bi-directional power converter 200B receives a 3-phase AC input Vacgrid from the grid-side module 101 which is then provided to a 3-phase AC to DC converter 102B of the bi-directional power converter 200B, that generates a DC voltage V1 which in turn is provided as an input to the isolated DC-DC conversion module 102C.

The isolated DC-DC converter 102C comprises a first stage 201 capable of converting the DC voltage V1 into a high frequency AC voltage V1ac of amplitude V1 and vice versa. The isolated DC-DC converter 102C comprises a second stage 204. The second stage 204 is capable of functioning in a power conversion mode converting a high frequency AC voltage V2ac of amplitude V2 into DC voltage Vdc of amplitude V2 or 2V2. FIG. 2B shows the power conversion mode of the second stage 204. These two stages 201 and 204 are coupled by an intermediary stage 203 providing high frequency isolation therebetween. The intermediary stage 203 includes a high frequency transformer connected between the first stage 201 and the second stage 202 having a turns ratio of V1:V2.

As shown in FIG. 2B, the second stage 204 of the DC-DC conversion module 102C comprises six power conversion switches S5, S6, S7, S8, S9, and S10. The second stage 204 also comprises a voltage selection switch S11 electrically coupled to the power conversion switches S5-S10. The second stage 204 also comprises capacitors C1 and C2 electrically coupled to the power conversion switches S5-S10 and the voltage selection switch S11. As shown in FIG. 2B, the bi-directional power converter 200B is a symmetrical converter such that the capacitors C1 and C2 are equally charged.

The operation, that is, switching on and off, of the voltage selection switch S11 determines whether the DC voltage Vdc, appearing across the capacitors C1 and C2, is V2 or 2V2. The voltage selection switch S11 is operated depending upon the type of the EV 106 to which the DC voltage Vdc is to be applied and voltage requirements of the battery of this EV 106. When the EV 106 is heavy-duty vehicle such as a bus or a truck, the switch S11 is turned ON to generate Vdc=2V2 else, the switch S11 is turned OFF to generate Vdc=V2. The charging device 200A detects the voltage requirement of the EV 106 using the controller module 104 shown in FIG. 2A, which in turn is electrically coupled with the bi-directional power converter 200B. Alternatively, the voltage requirement of the EV 106 is detected by the software module 105, which in turn is electrically coupled with the controller module 104. The software module 105, for example, via its user interface 105A receives the voltage requirement as a user input. Alternatively, one or more image capturing devices (not shown) in communication with the software module 105 record one or more images of the EV 106 and the software module 105 processes the images to determine a make and a type of the EV 106 based on which the voltage requirement is determined.

FIGS. 3A-3D illustrate current flows through the circuit diagram of the bi-directional power converter 200B shown in FIG. 2B when a voltage selection switch S11 of the bi-directional power converter 200B is open. The FIGS. 3A-3D illustrate a power conversion mode of the bi-directional power converter 200B. When the voltage selection switch S11 is turned OFF, that is opened, each of the output capacitors C1 and C2 are charged to a voltage equal to half the amplitude of the high frequency input voltage V2ac. Hence, the DC voltage Vdc is equal to the amplitude of the high frequency input voltage V2 as shown in FIGS. 3A-3D.

A switching table for the bi-directional power converter 200B with the voltage selection switch S11 turned OFF is shown in Table 2 below where:

The values 1 and 0 symbolize switch turn on and switch turn off respectively:

VAB is the voltage between nodes A and B representing the high frequency AC voltage V2ac; and Vdc is the DC voltage generated by the bi-directional power converter 200B.

TABLE 2

| VAB | S5 | S6 | S7 | S8 | S9 | S10 | Vdc |
|---|---|---|---|---|---|---|---|
| +V2 | 1 | 0 | 0 | 1 | 1 | 1 | +V2 |
| −V2 | 0 | 1 | 1 | 0 | 1 | 1 | +V2 |
| 0 | 1 | 1 | 0 | 0 | 0 or 1 | 0 or 1 | +V2 |
| 0 | 0 | 0 | 1 | 1 | 0 | 0 | +V2 |

It would be appreciated by a person skilled in the conventional art that during the zero state of the high frequency AC voltage V2ac represented by VAB in the table 2 above, the state of the switches S9 and S10 whether 0 or 1 does not matter.

FIGS. 4A-4D illustrate current flows through the circuit diagram of the bi-directional power converter 200B shown in FIG. 2B when a voltage selection switch s11 of the power converter 200B is closed. The FIGS. 4A-4D illustrate a power conversion mode of the bi-directional power converter 200B. When the voltage selection switch S11 is turned ON, that is closed, each of the capacitors C1 and C2 are charged to a voltage equal to the amplitude of the high frequency AC voltage V2ac. Hence, the DC voltage Vdc is equal to 2V2, that is, twice the amplitude V2 of high frequency AC voltage V2ac, as shown in FIGS. 4A-4D.

A switching table for the bi-directional power converter 200B with the voltage selection switch S11 turned ON is shown in Table 3 below where:

The values 1 and 0 symbolize switch turn on and switch turn off respectively;

VAB is the voltage between nodes A and B representing the high frequency AC voltage V2ac; and Vdc is the DC voltage generated by the bi-directional power converter 200B.

TABLE 3

| VAB | S5 | S6 | S7 | S8 | S9 | S10 | Vdc |
|---|---|---|---|---|---|---|---|
| +V2 | 1 | 0 | 0 | 0 | 1 | 0 | +2V2 |
| −V2 | 0 | 0 | 1 | 0 | 0 | 1 | +2V2 |
| 0 | 1 | 1 | 0 | 0 | 0 | 0 | +2V2 |
| 0 | 0 | 0 | 1 | 1 | 0 | 0 | +2V2 |

Figure 5:
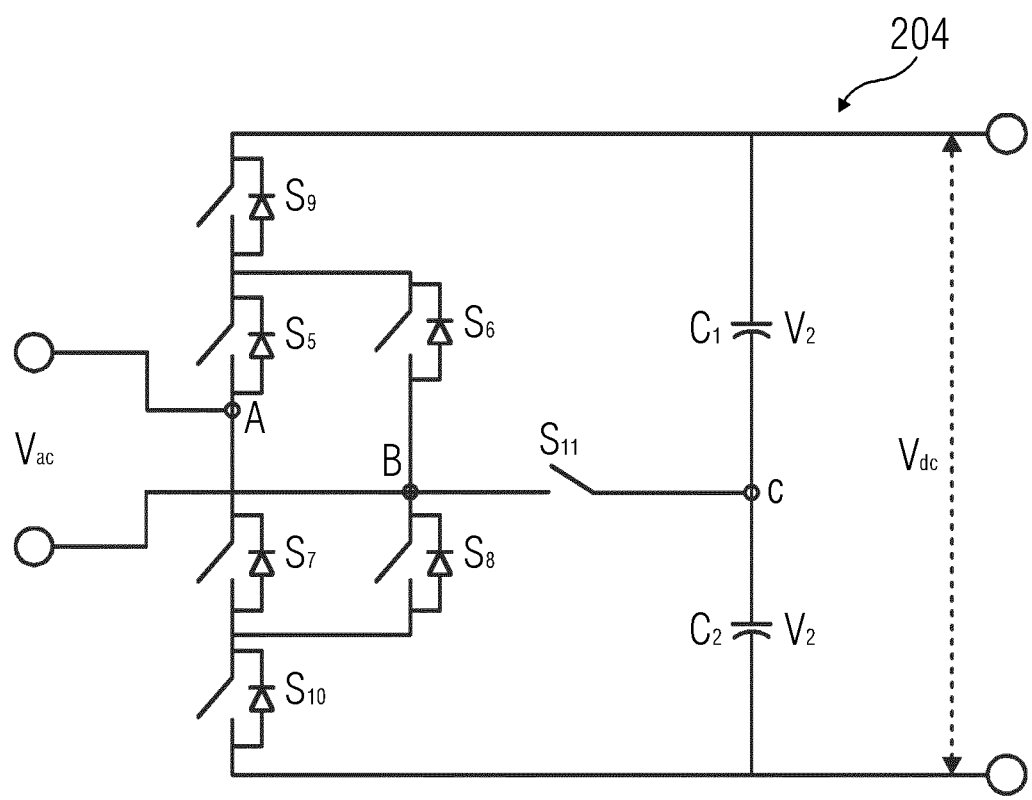
FIG. 5 illustrates the second stage of the bi-directional power converter shown in FIG. 2B being employed as a five-level inverter.

FIG. 5 illustrates the second stage 204 of the bi-directional power converter 200B shown in FIG. 2B being employed as a five-level inverter 500. FIG. 5 therefore, illustrates the bi-directional power converter 200B in a power inversion mode of operation, in which the DC voltage Vdc is converted into a 5-level AC voltage V2ac. The five voltage levels obtained corresponding to the DC voltage Vdc of 2V2 are 2V2, V2, 0, −V2 and −2V2 by operating the power conversion switches S5, S6, S7, S8, S9, S10 and the voltage selection switch S11 in a switching pattern shown below in Table 4 where, 1 and 0 symbolize an On state and an Off state respectively.

TABLE 4

| Vdc | S5 | S6 | S7 | S8 | S9 | S10 | S11 | Vac |
|---|---|---|---|---|---|---|---|---|
| +2V2 | 1 | 0 | 0 | 1 | 1 | 1 | 0 | +2V2 |
| +2V2 | 1 | 0 | 0 | 0 | 1 | 0 | 1 | V2 |
| +2V2 | 1 | 1 | 0 | 0 | 0 | 0 | 0 or 1 | 0 |
| +2V2 | 0 | 0 | 1 | 1 | 0 | 0 | 0 or 1 | 0 |
| +2V2 | 0 | 0 | 1 | 0 | 0 | 1 | 1 | −V2 |
| +2V2 | 0 | 1 | 1 | 0 | 1 | 1 | 0 | −2V2 |

It would be appreciated by a person skilled in the conventional art that during zero voltage level of the AC voltage Vac in the table 4 above, the state of the voltage selection switch S11 whether 0 or 1 does not matter.

Figure 1A:
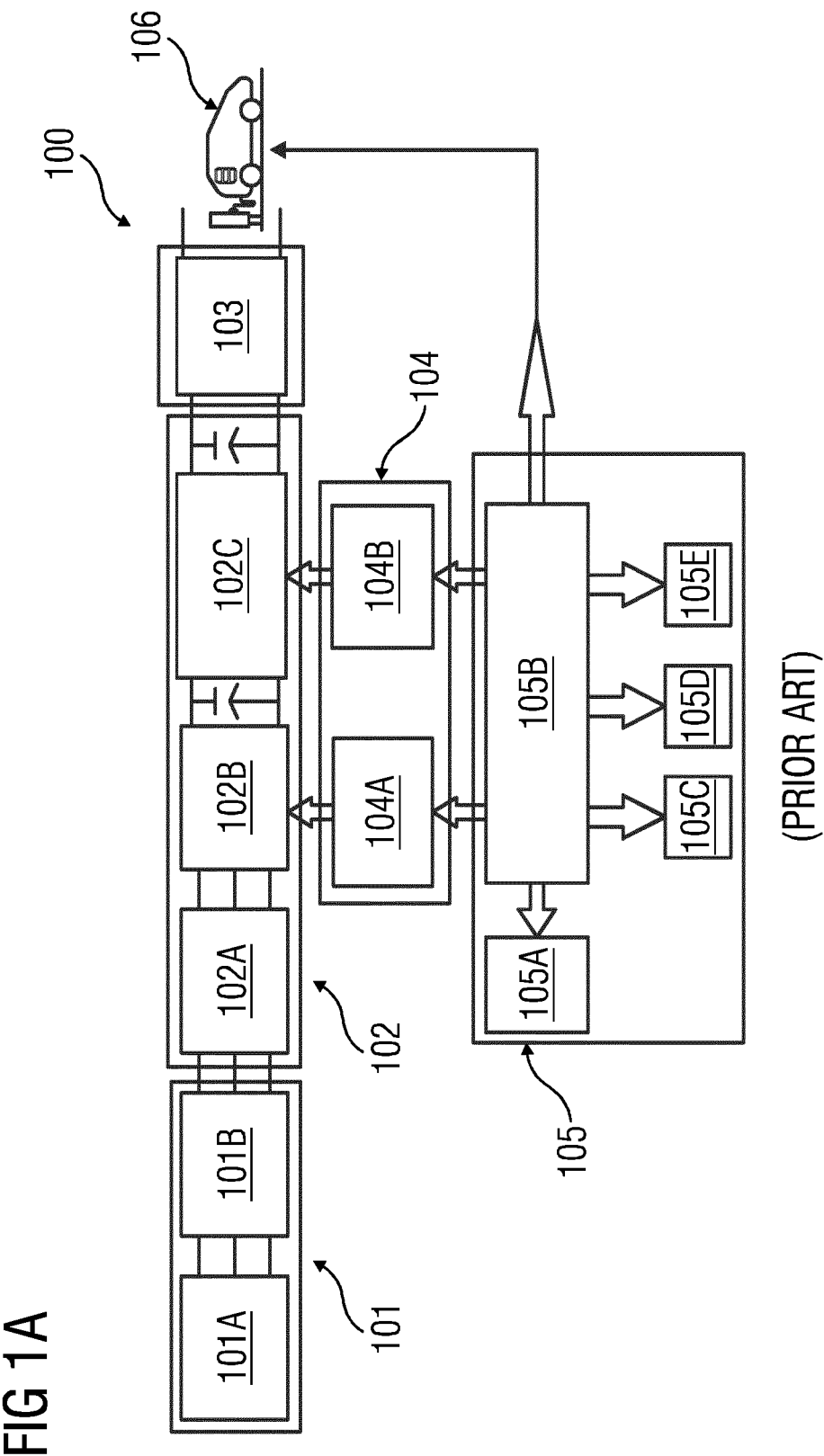
FIG. 1A illustrates a block diagram of a DC charger employed in charging of Electric Vehicles (EVs), according to state of the conventional art.
Figure 1B:
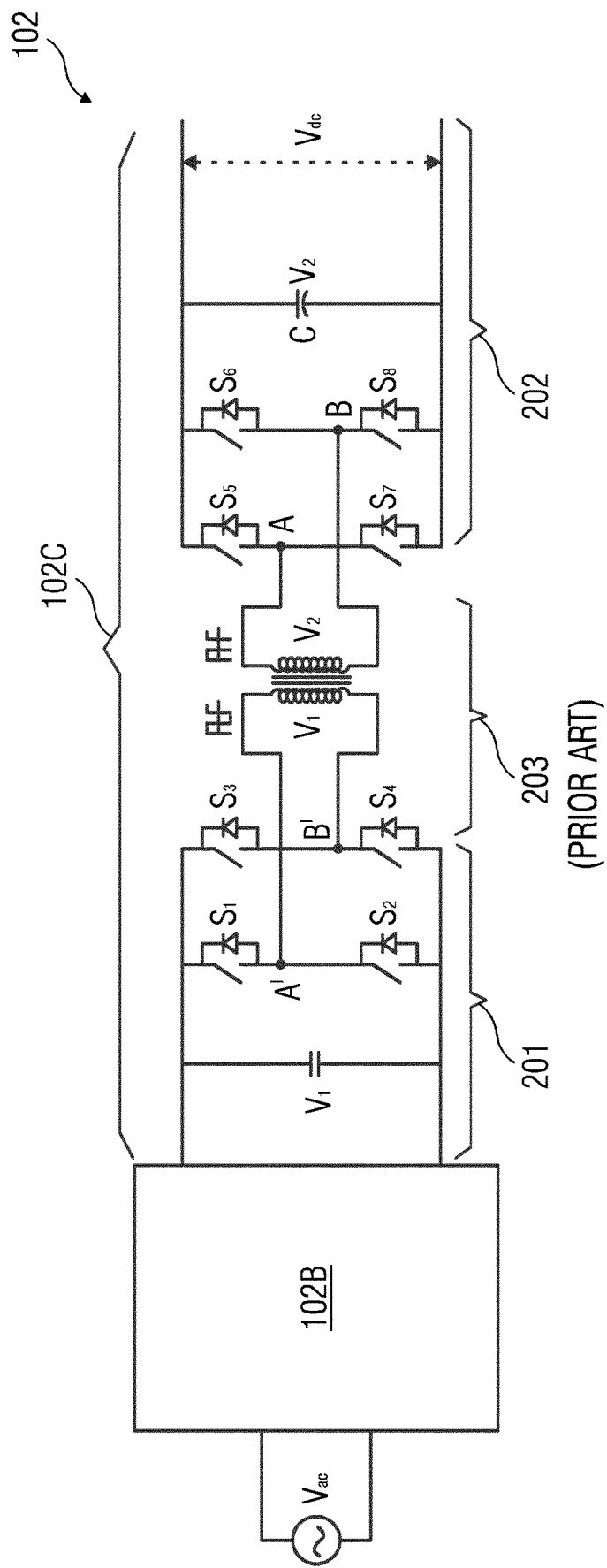
FIG. 1B illustrates an electrical circuit diagram of the power converter of the DC charger shown in FIG. 1A, according to state of the conventional art.
Figure 6:
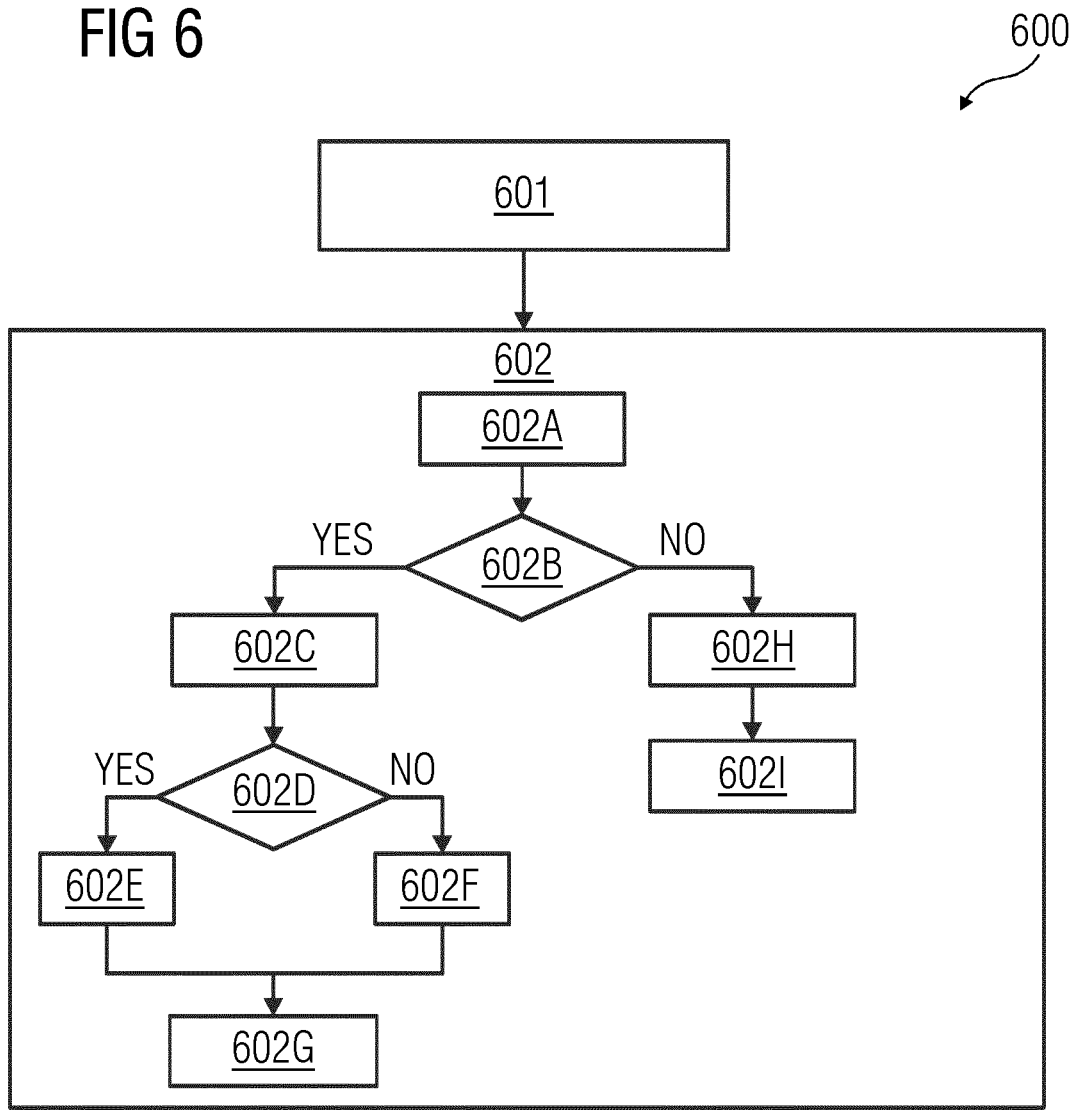
FIG. 6 illustrates a process flow chart of a method for transferring power between an electric vehicle and a power grid, according to an embodiment of the present disclosure.

FIG. 6 illustrates a process flow chart of a method 600 for transferring power between an electric vehicle (EV) 106 shown in FIGS. 1A and 2A, and a power grid, according to an embodiment of the present disclosure. In embodiments, the method 600 disclosed herein employs the charging device 200A shown in FIG. 2A.

At step 601, the method detects physical connection of the EV 106 to the vehicle-side module 103 of the charging device 200A.

At step 602, the method selectively operates the bi-directional power converter 200B of the charging device 200A shown in FIG. 2B, in a power conversion mode or a power inversion mode. At step 602A, the method receives a user input via a human machine interface of the charging device 200A regarding a mode of operation, that is, a power conversion mode or a power inversion mode in which the bi-directional power converter 200B is to be operated. The power conversion mode of the bi-directional power converter 200B comprises conversion of the AC voltage Vacgrid received from the power grid into the DC voltage Vdc having amplitudes V2 or 2V2.

At step 602B, the method determines whether a power conversion mode was selected by the user. If yes, then at step 602C, the method at step 602D determines the voltage requirement of the EV 106 connected to the charging device 200A. If the voltage requirement is for a heavy-duty EV 106, then the method at step 602E switches the voltage selection switch S11 of the second stage 204 of the bi-directional power converter 204 in a closed state. In the closed state of the voltage selection switch S11 the bi-directional power converter 200B generates the DC voltage Vdc having the amplitude 2V2. If the voltage requirement is not for a heavy-duty EV 106, then the method at step 602F switches the voltage selection switch S11 of the second stage 204 of the bi-directional power converter 204 in an open state. In the open state of the voltage selection switch S11 the bi-directional power converter 200B generates the DC voltage Vdc having the amplitude V2. In embodiments, the method thus, includes selectively positioning the voltage selection switch S11 between the open state and the closed state based on a voltage requirement of a battery of the EV 106. At step 602G, the method further includes providing the DC voltage Vdc to the EV 106 via the vehicle-side module 103 of the charging device 200A for charging the EV 106.

At step 602B, the method determines whether a power conversion mode was selected by the user. If no, then at step 602H, the method operates the bi-directional power converter 200B in the power inversion mode wherein the DC voltage Vdc is received from the EV 106 and converted into the multi-level AC voltage V2ac having levels −0.5V2, −V2, 0, +V2, and +0.5V2. At step 602I, the method provides the multi-level AC voltage V2ac to the intermediary stage 203 of the bi-directional power converter 200B which is further converted into a high frequency AC voltage V1ac by the high frequency transformer of the intermediary stage 203 which in turn is converted into a DC voltage V1 by the first stage 201 of the bi-directional power converter 200B which can either be directly fed to a DC power grid or an energy storage system or converted into an AC voltage Vac and fed back to the AC power grid.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A bi-directional power converter, comprising:
an isolated DC-DC converter comprising:
a first stage capable of converting a DC voltage into a high frequency AC voltage (V1ac) having an amplitude V1 and vice versa;
a second stage comprising six power conversion switches, a voltage selection switch, and two or more capacitors, electrically coupled to one another, wherein the second stage is configured to:
convert a high frequency AC voltage (V2ac) having an amplitude V2 into a DC voltage, wherein an amplitude of the DC voltage is one of equal to V2 and 2V2; and
convert the DC voltage into the high frequency AC voltage (V2ac), wherein the high frequency AC voltage (V2ac) is a multi-level AC voltage; and
an intermediary stage electrically coupled to the first stage and the second stage and comprising a high frequency transformer, wherein a turns ratio of the high frequency transformer equals a ratio of the high frequency AC voltage (V1ac) and the high frequency AC voltage (V2ac);
wherein in the second stage, the power conversion switches are arranged across a secondary winding of the high frequency transformer such that:
a first terminal of a first power conversion switch is connected to a second terminal of a second power conversion switch and a second terminal of the first power conversion switch is connected to a first end of the secondary winding;
a first terminal of the second power conversion switch is connected to positive DC voltage;
a first terminal of a third power conversion switch is connected to the first terminal of the first power conversion switch and a second terminal of the second power conversion switch, and a second terminal of the third power conversion switch is connected to a second end of the secondary winding;
a first terminal of a fourth power conversion switch is connected to the first end and a second terminal of the fourth power conversion switch is connected to a first terminal of a fifth power conversion switch;
a second terminal of the fifth power conversion switch is connected to negative DC voltage; and
a first terminal of a sixth power conversion switch is connected to the second end, and a second terminal of the sixth power conversion switch is connected to the first terminal of the fifth power conversion switch and a second terminal of the fourth power conversion switch.

2. The power converter according to claim 1, wherein the multi-level AC voltage (V2ac) comprises five levels, and wherein the five levels are +0.5V2, +V2, 0, −V2 and −0.5V2 corresponding to the DC voltage having the amplitude V2.

3. The power converter according to claim 1, wherein the first stage comprises four power conversion switches electrically coupled to a primary winding of the high frequency transformer such that:
a second terminal of a first power conversion switch is connected to a first terminal of a second power conversion switch (and a first end of the primary winding is connected to the second terminal of the first power conversion switch and the first terminal of the second power conversion switch;
a first terminal of the first power conversion switch is connected to a first terminal of a third power conversion switch, and a second terminal of the second power conversion switch is connected to a second terminal of a fourth power conversion switch; and
a second terminal of the third power conversion switch is connected to a first terminal of the fourth power conversion switch, and a second end of the primary winding is connected to the first terminal of the fourth power conversion switch and the second terminal of the third power conversion switch.

4. The power converter according to claim 3, wherein each of the power conversion switches, when in an off state, blocks a positive DC voltage applied across the first terminal and the second terminal of each of the power conversion switches.

5. The power converter according to claim 1, wherein in the second stage, the voltage selection switch and the capacitors are arranged across the secondary winding of the high frequency transformer such that:
the capacitors form a DC midpoint therebetween for the DC voltage; and
the voltage selection switch is connected between the DC midpoint and the second end.

6. The power converter according to claim 1, wherein:
the voltage selection switch when in a closed state enables the second stage to generate the DC voltage having the amplitude 2V2 corresponding to the high frequency AC voltage (V2ac) of the amplitude V2; and the voltage selection switch when in an open state enables the second stage to generate the DC voltage having the amplitude V2 corresponding to the high frequency AC voltage (V2ac) having the amplitude V2.

7. A control unit for controlling the bi-directional power converter according to claim 1, wherein the control unit comprises one or more controllers configured to:
selectively switch the voltage selection switch, of the second stage of the isolated DC-DC converter of the bi-directional power converter, between an on state and an off state based on a voltage requirement of a battery of an electric vehicle when connected to a vehicle-side module connectable to the bi-directional power converter;
wherein when the voltage selection switch is in the off state, the control unit is configured to:
switch on a first power conversion switch, a second power conversion switch, a fifth power conversion switch, and a sixth power conversion switch of the second stage, and switch off a third power conversion switch, and a fourth power conversion switch, when the high frequency AC voltage (V2ac) is +V2;
switch on the second power conversion switch, the third power conversion switch, the fourth power conversion switch, and the fifth power conversion switch (S10) of the second stage, and switch off the first power conversion switch and the sixth power conversion switch, when the high frequency AC voltage (V2ac) is −V2; and
switch on the fourth power conversion switch and the sixth power conversion switch, and switch off the first power conversion switch, the second power conversion switch, the third power conversion switch, and the fifth power conversion switch, when the high frequency AC voltage (V2ac) is zero; and
wherein when the voltage selection switch is in the on state, the control unit is configured to:
switch on the first power conversion switch, the second power conversion switch, and switch off the third power conversion switch, and the fourth power conversion switch, the fifth power conversion switch, and the sixth power conversion switch of the second stage, when the high frequency AC voltage (V2ac) is +V2;
switch on the fourth power conversion switch and the fifth power conversion switch, and switch off the first power conversion switch, the second power conversion switch, the third power conversion switch, and the sixth power conversion switch of the second stage, when the high frequency AC voltage (V2ac) is −V2; and
switch on the fourth power conversion switch and the sixth power conversion switch, and switch off the first power conversion switch, the second power conversion switch, the third power conversion switch, and the fifth power conversion switch, when the high frequency AC voltage (V2ac) is zero.

8. The control unit according to claim 7, comprises one or more controllers configured to control the power conversion switches and the voltage selection switch such that a DC voltage available across capacitors of the second stage is converted into a high frequency AC voltage at a secondary winding of an intermediary stage of an isolated DC-DC converter of the bi-directional converter, wherein the high frequency AC voltage (V2ac) is a multi-level AC voltage, and wherein the one or more controllers are configured to:
switch on the first power conversion switch, the second power conversion, the fifth power conversion switch and the sixth power conversion switch, and switch off the third power conversion switch, the fourth power conversion switch and the voltage selection switch, for generating a positive multi-level voltage having an amplitude equal to the DC voltage;
switch on the first power conversion switch, the second power conversion and the voltage selection switch, and switch off the third power conversion switch, the fourth power conversion switch the fifth power conversion switch and the sixth power conversion switch, for generating a positive multi-level voltage having an amplitude equal to half of the DC voltage;
switch off the first power conversion switch, the second power conversion, the third power conversion switch and the sixth power conversion switch, and switch on the fourth power conversion switch, the fifth power conversion switch and the voltage selection switch, for generating a negative multi-level voltage having an amplitude equal to half of the DC voltage;
switch off the first power conversion switch, the sixth power conversion and the voltage selection switch, and switch on the second power conversion switch, the third power conversion switch, the fourth power conversion switch and the fifth power conversion switch, for generating a negative multi-level voltage having an amplitude equal to the DC voltage;
switch on the second power conversion switch, the third power conversion switch, the fourth power conversion and the fifth power conversion switch, and switch off the first power conversion switch, the sixth power conversion switch and the voltage selection switch, for generating a multi-level voltage having a zero amplitude; and
switch off the first power conversion switch, the second power conversion switch, the third power conversion switch and the sixth power conversion, and switch on the fourth power conversion switch, and the fifth power conversion switch) and the voltage selection switch, for generating a multi-level voltage having a zero amplitude.

9. A charging device for transferring power between an electric vehicle and a power grid, wherein the charging device comprises:
a control unit;
the bi-directional power converter according to claim 1, being controlled by the control unit;
a grid-side module capable of:
receiving one of an AC voltage and a DC voltage from the power grid; and
delivering one of the AC voltage and the DC voltage to the power grid; and
a vehicle-side module capable of:
receiving the DC voltage from the electric vehicle; and
delivering the DC voltage to the electric vehicle,
and wherein the vehicle-side module is electrically coupled to the grid-side module via the bi-directional power converter.

10. A method for transferring power between an electric vehicle and a power grid using the charging device according to claim 9, comprising:
detecting a physical connection of the electric vehicle to the vehicle-side module of the charging device; and
selectively operating the bi-directional power converter of the charging device in one of a power conversion mode and a power inversion mode.

11. The method according to claim 10, wherein the power conversion mode of the bi-directional power converter comprises conversion of the AC voltage received from the power grid into the DC voltage having one of the amplitudes V2 and 2V2, and wherein the DC voltage is provided to the electrical vehicle via the vehicle-side module of the charging device for charging the electric vehicle.

12. The method according to claim 11, wherein the voltage selection switch of the second stage of the bi-directional power converter, when in a closed state enables the bi-directional power converter to generate the DC voltage having the amplitude 2V2 and when in an open state enables the bi-directional power converter to generate the DC voltage having the amplitude V2.

13. The method according to claim 12, wherein the voltage selection switch is selectively positioned between the open state and the closed state based on a voltage requirement of a battery of the electric vehicle.

14. The method according to claim 10, wherein the power inversion mode of the bi-directional power converter comprises conversion of the DC voltage received from the electric vehicle into the multi-level AC voltage that is provided to intermediary stage of the bi-directional power converter, and wherein the multi-level AC voltage comprises levels −0.5V2, −V2, 0, +V2, and +0.5V2 corresponding to the DC voltage having an amplitude V2.

\* \* \* \* \*